(12) United States Patent
Kortum et al.

(10) Patent No.: US 8,190,688 B2
(45) Date of Patent: May 29, 2012

(54) SYSTEM AND METHOD OF TRANSMITTING PHOTOGRAPHS FROM A SET TOP BOX

(75) Inventors: Philip Ted Kortum, Houston, TX (US); Marc Andrew Sullivan, Austin, TX (US); James L. Cansler, Jr., Pfugerville, TX (US); Alyssa Lenorah Noll Williams, Elmhurst, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1295 days.

(21) Appl. No.: 11/179,048

(22) Filed: Jul. 11, 2005

(65) Prior Publication Data

US 2007/0011250 A1    Jan. 11, 2007

(51) Int. Cl.
*G06F 15/16* (2006.01)
(52) U.S. Cl. ............ 709/206; 709/224; 709/245; 725/5; 725/132; 725/29; 715/823; 715/845
(58) Field of Classification Search ........... 709/205–206
See application file for complete search history.

(56) References Cited

U.S. PATENT DOCUMENTS

| | | | |
|---|---|---|---|
| 4,243,147 A | 1/1981 | Twitchell et al. | |
| 4,356,509 A | 10/1982 | Skerlos et al. | |
| 4,768,926 A | 9/1988 | Gilbert, Jr. | |
| 4,907,079 A | 3/1990 | Turner et al. | |
| 5,126,731 A | 6/1992 | Cromer, Jr. et al. | |
| 5,163,340 A | 11/1992 | Bender | |
| 5,475,835 A | 12/1995 | Hickey | |
| 5,532,748 A | 7/1996 | Naimpally | |
| 5,541,917 A | 7/1996 | Farris | |
| 5,589,892 A | 12/1996 | Knee et al. | |
| 5,592,477 A | 1/1997 | Farris et al. | |
| 5,610,916 A | 3/1997 | Kostreski et al. | |
| 5,613,012 A | 3/1997 | Hoffman et al. | |
| 5,650,831 A | 7/1997 | Farwell | |
| 5,651,332 A | 7/1997 | Moore et al. | |
| 5,656,898 A | 8/1997 | Kalina | |
| 5,675,390 A | 10/1997 | Schindler et al. | |

(Continued)

FOREIGN PATENT DOCUMENTS

EP    1445936 A1    8/2004

(Continued)

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner* — Hua Fan
(74) *Attorney, Agent, or Firm* — Toler Law Group, PC

(57) ABSTRACT

A method of emailing photographs from a set top box is disclosed and includes presenting a menu of photographs at a television coupled to the set top box. The photographs within the menu can be highlighted using a remote control device. The method further includes presenting an email button at the television and presenting an address book. The address book contains at least one recipient email address. Further, the method includes sending an email addressed to the at least one recipient email address. In particular, the email includes a return email address that causes a response to the email to be sent to a location other than the set top box.

16 Claims, 4 Drawing Sheets

U.S. PATENT DOCUMENTS

| | | |
|---|---|---|
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,253,231 B1 | 6/2001 | Fujii |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 * | 10/2002 | Krueger et al. ............... 709/206 |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,618,858 B1 * | 9/2003 | Gautier ........................ 725/132 |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,708,176 B2 * | 3/2004 | Strunk et al. .......................... 1/1 |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |
| 6,826,775 B1 | 11/2004 | Howe et al. |
| 6,828,993 B1 | 12/2004 | Hendricks et al. |
| 6,837,436 B2 * | 1/2005 | Swartz et al. ............ 235/472.02 |
| 6,909,874 B2 | 6/2005 | Holtz et al. |
| 6,938,021 B2 | 8/2005 | Shear et al. |
| 7,006,993 B1 * | 2/2006 | Cheong et al. ................... 705/38 |
| 7,028,075 B2 * | 4/2006 | Morris .......................... 709/206 |
| 7,054,907 B1 * | 5/2006 | Sherwood ..................... 709/206 |
| 7,286,256 B2 * | 10/2007 | Herbert ........................ 358/1.16 |
| 7,346,917 B2 * | 3/2008 | Gatto et al. ......................... 725/5 |
| 7,487,214 B2 * | 2/2009 | Qureshi et al. ................ 709/206 |
| 7,661,075 B2 * | 2/2010 | Lahdesmaki .................. 715/841 |
| 2001/0011261 A1 | 8/2001 | Mullen-Schultz |
| 2001/0016945 A1 | 8/2001 | Inoue |
| 2001/0016946 A1 | 8/2001 | Inoue |

| | | | | | | |
|---|---|---|---|---|---|---|
| 2001/0034664 A1 | 10/2001 | Brunson | | 2003/0046091 A1 | 3/2003 | Arneson et al. |
| 2001/0044794 A1 | 11/2001 | Nasr et al. | | 2003/0046689 A1 | 3/2003 | Gaos |
| 2001/0048677 A1 | 12/2001 | Boys | | 2003/0056223 A1 | 3/2003 | Costa et al. |
| 2001/0049826 A1 | 12/2001 | Wilf | | 2003/0058277 A1 | 3/2003 | Bowman-Amuah |
| 2001/0054008 A1 | 12/2001 | Miller et al. | | 2003/0061611 A1 | 3/2003 | Pendakur |
| 2001/0054009 A1 | 12/2001 | Miller et al. | | 2003/0071792 A1 | 4/2003 | Safadi |
| 2001/0054067 A1 | 12/2001 | Miller et al. | | 2003/0093793 A1 | 5/2003 | Gutta |
| 2001/0056350 A1 | 12/2001 | Calderone et al. | | 2003/0100340 A1 | 5/2003 | Cupps et al. |
| 2002/0001303 A1 | 1/2002 | Boys | | 2003/0110161 A1 | 6/2003 | Schneider |
| 2002/0001310 A1 | 1/2002 | Mai et al. | | 2003/0110503 A1 | 6/2003 | Perkes |
| 2002/0002496 A1 | 1/2002 | Miller et al. | | 2003/0126136 A1 | 7/2003 | Omoigui |
| 2002/0003166 A1 | 1/2002 | Miller et al. | | 2003/0135771 A1 | 7/2003 | Cupps et al. |
| 2002/0007307 A1 | 1/2002 | Miller et al. | | 2003/0141987 A1 | 7/2003 | Hayes |
| 2002/0007313 A1 | 1/2002 | Mai et al. | | 2003/0145321 A1 | 7/2003 | Bates et al. |
| 2002/0007485 A1 | 1/2002 | Rodriguez et al. | | 2003/0149989 A1 | 8/2003 | Hunter et al. |
| 2002/0010639 A1 | 1/2002 | Howey et al. | | 2003/0153353 A1 | 8/2003 | Cupps et al. |
| 2002/0010745 A1 | 1/2002 | Schneider | | 2003/0153354 A1 | 8/2003 | Cupps et al. |
| 2002/0010935 A1 | 1/2002 | Sitnik | | 2003/0159026 A1 | 8/2003 | Cupps et al. |
| 2002/0016736 A1 | 2/2002 | Cannon et al. | | 2003/0160830 A1 | 8/2003 | DeGross |
| 2002/0022963 A1 | 2/2002 | Miller et al. | | 2003/0163601 A1 | 8/2003 | Cupps et al. |
| 2002/0022970 A1 | 2/2002 | Noll et al. | | 2003/0163666 A1 | 8/2003 | Cupps et al. |
| 2002/0022992 A1 | 2/2002 | Miller et al. | | 2003/0172380 A1 | 9/2003 | Kikinis |
| 2002/0022993 A1 | 2/2002 | Miller et al. | | 2003/0182237 A1 | 9/2003 | Costa et al. |
| 2002/0022994 A1 | 2/2002 | Miller et al. | | 2003/0182420 A1 | 9/2003 | Jones et al. |
| 2002/0022995 A1 | 2/2002 | Miller et al. | | 2003/0185232 A1 | 10/2003 | Moore et al. |
| 2002/0023959 A1 | 2/2002 | Miller et al. | | 2003/0187641 A1 | 10/2003 | Moore et al. |
| 2002/0026357 A1 | 2/2002 | Miller et al. | | 2003/0187646 A1 | 10/2003 | Smyers et al. |
| 2002/0026358 A1 | 2/2002 | Miller et al. | | 2003/0187800 A1 | 10/2003 | Moore et al. |
| 2002/0026369 A1 | 2/2002 | Miller et al. | | 2003/0189509 A1 | 10/2003 | Hayes et al. |
| 2002/0026475 A1 | 2/2002 | Marmor | | 2003/0189589 A1 | 10/2003 | LeBlanc et al. |
| 2002/0029181 A1 | 3/2002 | Miller et al. | | 2003/0194141 A1 | 10/2003 | Kortum et al. |
| 2002/0030105 A1 | 3/2002 | Miller et al. | | 2003/0194142 A1 | 10/2003 | Kortum et al. |
| 2002/0032603 A1 | 3/2002 | Yeiser | | 2003/0208396 A1 | 11/2003 | Miller et al. |
| 2002/0035404 A1 | 3/2002 | Ficco et al. | | 2003/0208758 A1 | 11/2003 | Schein et al. |
| 2002/0040475 A1 | 4/2002 | Yap et al. | | 2003/0226044 A1 | 12/2003 | T. Cupps et al. |
| 2002/0042915 A1 | 4/2002 | Kubischta et al. | | 2003/0226145 A1 | 12/2003 | Marsh |
| 2002/0046093 A1 | 4/2002 | Miller et al. | | 2003/0229900 A1 | 12/2003 | Reisman |
| 2002/0049635 A1 | 4/2002 | Mai et al. | | 2004/0003041 A1 | 1/2004 | Moore et al. |
| 2002/0054087 A1 | 5/2002 | Noll et al. | | 2004/0003403 A1 | 1/2004 | Marsh |
| 2002/0054750 A1 | 5/2002 | Ficco et al. | | 2004/0006769 A1 | 1/2004 | Ansari et al. |
| 2002/0059163 A1 | 5/2002 | Smith | | 2004/0006772 A1 | 1/2004 | Ansari et al. |
| 2002/0059425 A1 | 5/2002 | Belfiore et al. | | 2004/0010602 A1 | 1/2004 | Van Vleck et al. |
| 2002/0059599 A1 | 5/2002 | Schein et al. | | 2004/0015997 A1 | 1/2004 | Ansari et al. |
| 2002/0065717 A1 | 5/2002 | Miller et al. | | 2004/0030750 A1 | 2/2004 | Moore et al. |
| 2002/0067438 A1 | 6/2002 | Baldock | | 2004/0031058 A1 | 2/2004 | Reisman |
| 2002/0069220 A1 | 6/2002 | Tran | | 2004/0031856 A1 | 2/2004 | Atsmon et al. |
| 2002/0069282 A1 | 6/2002 | Reisman | | 2004/0034877 A1 | 2/2004 | Nogues |
| 2002/0069294 A1 | 6/2002 | Herkersdorf et al. | | 2004/0049728 A1 | 3/2004 | Langford |
| 2002/0072970 A1 | 6/2002 | Miller et al. | | 2004/0064351 A1 | 4/2004 | Mikurak |
| 2002/0078442 A1 | 6/2002 | Reyes et al. | | 2004/0068740 A1 | 4/2004 | Fukuda et al. |
| 2002/0097261 A1 | 7/2002 | Gottfurcht et al. | | 2004/0068753 A1 | 4/2004 | Robertson et al. |
| 2002/0104095 A1 | 8/2002 | Nguyen et al. | | 2004/0070491 A1 | 4/2004 | Huang et al. |
| 2002/0106119 A1 | 8/2002 | Foran et al. | | 2004/0073918 A1 | 4/2004 | Ferman et al. |
| 2002/0112239 A1 | 8/2002 | Goldman | | 2004/0098571 A1 | 5/2004 | Falcon |
| 2002/0116392 A1 | 8/2002 | McGrath et al. | | 2004/0107125 A1 | 6/2004 | Guheen et al. |
| 2002/0124055 A1 | 9/2002 | Reisman | | 2004/0107439 A1 | 6/2004 | Hassell et al. |
| 2002/0128061 A1 | 9/2002 | Blanco | | 2004/0111745 A1 | 6/2004 | Schein et al. |
| 2002/0129094 A1 | 9/2002 | Reisman | | 2004/0111756 A1 | 6/2004 | Stuckman et al. |
| 2002/0133402 A1 | 9/2002 | Faber et al. | | 2004/0117813 A1 | 6/2004 | Karaoguz et al. |
| 2002/0138840 A1 | 9/2002 | Schein et al. | | 2004/0117824 A1 | 6/2004 | Karaoguz et al. |
| 2002/0152264 A1 | 10/2002 | Yamasaki | | 2004/0128342 A1 | 7/2004 | Maes et al. |
| 2002/0169611 A1 | 11/2002 | Guerra et al. | | 2004/0139173 A1 | 7/2004 | Karaoguz et al. |
| 2002/0170063 A1 | 11/2002 | Ansari et al. | | 2004/0143600 A1 | 7/2004 | Musgrove et al. |
| 2002/0173344 A1 | 11/2002 | Cupps et al. | | 2004/0143652 A1 | 7/2004 | Grannan et al. |
| 2002/0188955 A1 | 12/2002 | Thompson et al. | | 2004/0148408 A1 | 7/2004 | Nadarajah |
| 2002/0193997 A1 | 12/2002 | Fitzpatrick et al. | | 2004/0150676 A1 | 8/2004 | Gottfurcht et al. |
| 2002/0194601 A1 | 12/2002 | Perkes et al. | | 2004/0183839 A1 | 9/2004 | Gottfurcht et al. |
| 2002/0198874 A1 | 12/2002 | Nasr et al. | | 2004/0194136 A1 | 9/2004 | Finseth et al. |
| 2003/0005445 A1 | 1/2003 | Schein et al. | | 2004/0198386 A1 | 10/2004 | Dupray |
| 2003/0009771 A1 | 1/2003 | Chang | | 2004/0201600 A1 | 10/2004 | Kakivaya et al. |
| 2003/0011682 A1 | 1/2003 | Sellen et al. | | 2004/0210633 A1 | 10/2004 | Brown et al. |
| 2003/0012365 A1 | 1/2003 | Goodman | | 2004/0210935 A1 | 10/2004 | Schein et al. |
| 2003/0014750 A1 | 1/2003 | Kamen | | 2004/0213271 A1 | 10/2004 | Lovy et al. |
| 2003/0018975 A1 | 1/2003 | Stone | | 2004/0221302 A1 | 11/2004 | Ansari et al. |
| 2003/0023435 A1 | 1/2003 | Josephson | | 2004/0223485 A1 | 11/2004 | Arellano et al. |
| 2003/0023440 A1 | 1/2003 | Chu | | 2004/0226035 A1 | 11/2004 | Hauser, Jr. |
| 2003/0028890 A1 | 2/2003 | Swart et al. | | 2004/0226045 A1 | 11/2004 | Nadarajah |
| 2003/0033416 A1 | 2/2003 | Schwartz | | 2004/0239624 A1 | 12/2004 | Ramian |
| 2003/0043915 A1 | 3/2003 | Costa et al. | | 2004/0252119 A1 | 12/2004 | Hunleth et al. |

| | | | |
|---|---|---|---|
| 2004/0252120 | A1 | 12/2004 | Hunleth et al. |
| 2004/0252769 | A1 | 12/2004 | Costa et al. |
| 2004/0252770 | A1 | 12/2004 | Costa et al. |
| 2004/0260407 | A1 | 12/2004 | Wimsatt |
| 2004/0261116 | A1 | 12/2004 | McKeown et al. |
| 2004/0267729 | A1 | 12/2004 | Swaminathan et al. |
| 2004/0268393 | A1 | 12/2004 | Hunleth et al. |
| 2005/0027851 | A1 | 2/2005 | McKeown et al. |
| 2005/0038814 | A1 | 2/2005 | Iyengar et al. |
| 2005/0044280 | A1 | 2/2005 | Reisman |
| 2005/0097612 | A1 | 5/2005 | Pearson et al. |
| 2005/0132295 | A1 | 6/2005 | Noll et al. |
| 2005/0195961 | A1 | 9/2005 | Pasquale et al. |
| 2007/0078965 | A1* | 4/2007 | Shimamura et al. .......... 709/224 |

FOREIGN PATENT DOCUMENTS

| | | |
|---|---|---|
| GB | 2377336 A | 1/2003 |
| KR | 1019990033070 A | 5/1999 |
| KR | 1020000033284 A | 6/2000 |
| KR | 1020010019104 A | 3/2001 |
| KR | 1020060049329 | 10/2007 |
| WO | WO 99/63759 A2 | 12/1999 |
| WO | 00/11585 A1 | 3/2000 |
| WO | WO 00/28689 A2 | 5/2000 |
| WO | WO 01/60066 A1 | 8/2001 |
| WO | WO 02/017627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/148,967, filed Jun. 9, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.
James Waters, Net4TV Voice—Introducing Neon Tech's SurfReady Set-Top Box, www.net4tv.com, Jan. 7, 2001, (10 pgs).
GB Patent Application No. 0610825.2, Combined Search and Examination Report mailed Oct. 6, 2006.
GB Patent Application No. 0610825.2, Second Examination Report mailed Sep. 1, 2008.
GB Patent Application No. 0610825.2, Examination Report mailed Jan. 23, 2009.
DE Patent Application No. 10 2006 024 777.9-31, Office Action mailed Jan. 16, 2009.
"Ruel's Review: SurfReady NTV-2500", http://ruel.net/top/box.review.neon.ntv-2500.htm, Jan. 8, 2001.

* cited by examiner

SYSTEM AND METHOD OF TRANSMITTING PHOTOGRAPHS FROM A SET TOP BOX

FIELD OF THE DISCLOSURE

The present disclosure relates to set top boxes.

BACKGROUND

For years, televisions have been a staple of consumer electronics sales. As such, a large majority of households in the United States owns at least one television. Providing content to those televisions is a lucrative business and there are numerous types of television content to choose from. For example, viewers can subscribe to digital broadband television networks and digital satellite television networks in order to receive standard digital television content or high definition television content. In addition, many companies now offer digital video recorders (DVRs) that can be incorporated into television set top boxes. A DVR can be used to record digital television content transmitted to the set top box.

In addition, set top box functionality is being expanded beyond simply providing television content. For example, many set top boxes include some sort of Internet or other communication capabilities.

Accordingly, there is a need for an improved system and method of using a set top box.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION OF THE DRAWINGS

Figure 1:
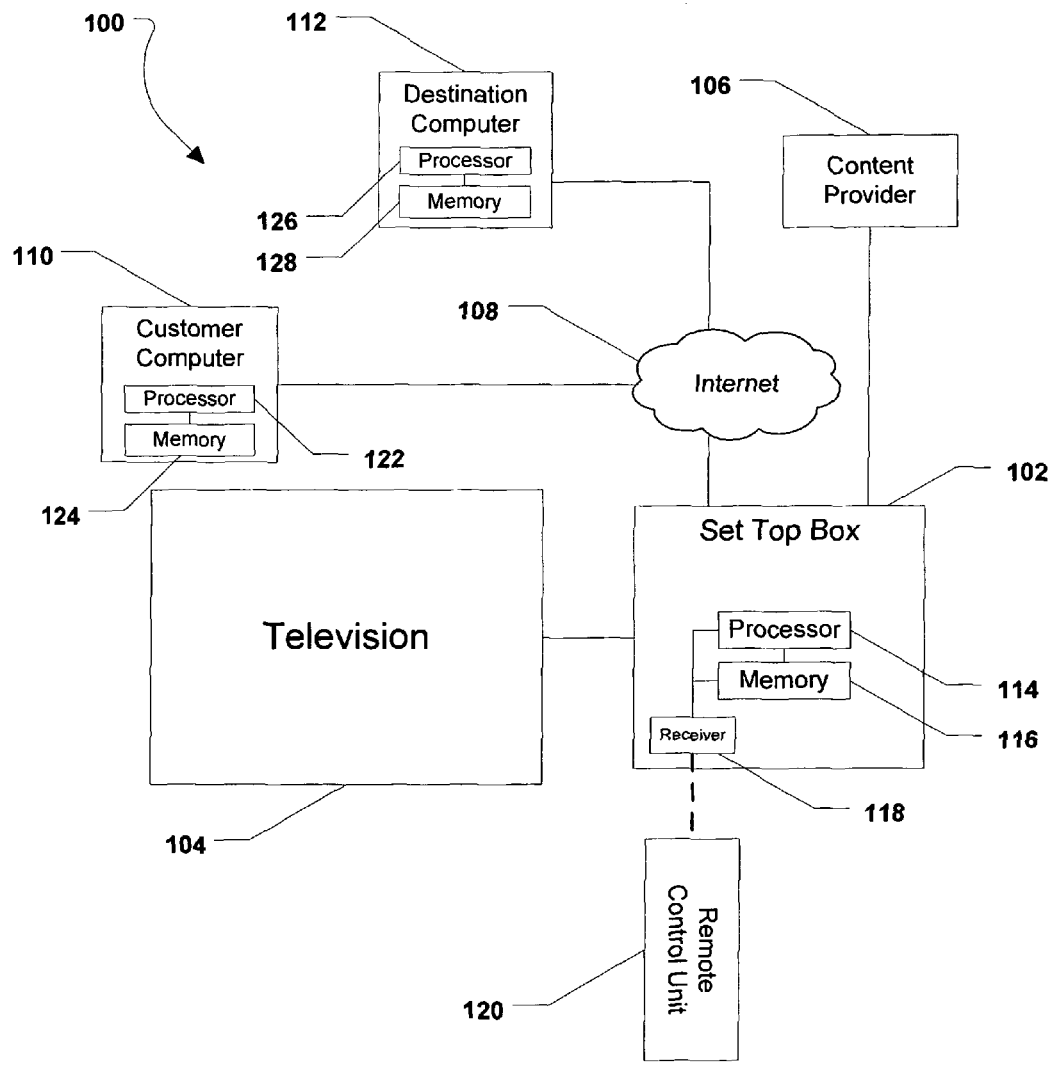
FIG. 1 is a block diagram representative of a system over which television content can be sent and received.

A method of emailing photographs from a set top box is disclosed and includes presenting a menu of photographs at a television coupled to the set top box. The photographs within the menu can be highlighted using a remote control device. The method further includes presenting an email button at the television and presenting an address book. The address book contains at least one recipient email address. Further, the method includes sending an email addressed to the at least one recipient email address. In particular, the email includes a return email address that causes a response to the email to be sent to a location other than the set top box.

In a particular embodiment, the return email address corresponds to an email address associated with a customer account. Further, in a particular embodiment, the customer account is associated with a user of the set top box. In still another particular embodiment, the method includes presenting a send button at the television and transmitting the email when the send button is selected.

In yet another particular embodiment, the method also includes presenting an address book set-up screen. Additionally, in a particular embodiment, the method includes importing an address list to the address book. In another particular embodiment, the method also includes receiving an email address and adding the email address to the address book.

Also, in a particular embodiment, the method includes receiving a nickname for the email address and adding the nickname to the address book.

In another embodiment, a set top box is disclosed and includes a processor, a computer readable medium that is accessible to the processor, and a computer program that is stored within the computer readable medium. In this embodiment, the computer program includes instructions to present a menu of photographs at a television, instructions to present an email button at the television, and instructions to present an address book in response to the email button being selected. The address book contains one or more email addresses-that correspond to one or more recipients. Further, in this embodiment, the computer program includes instructions to create an email that is addressed to at least one recipient address. Additionally, the email includes a return email address that corresponds to a customer email address that is associated with a customer account that is linked to the set top box. Moreover, the email appears to be sent from the customer email address and not the set top box.

In yet another embodiment, a graphical user interface for a display that is coupled to a set top box is disclosed and includes an array of photograph thumbnails, a photograph viewing window, and an address book that contains one or more recipient email addresses. In this embodiment, after a recipient email address is selected, an email is created that includes a return email address that will cause a reply to the email to be sent to a location other than the set top box.

In still another embodiment, a computer is disclosed and includes a processor, a computer readable medium that is accessible to the processor, and a computer program that is stored within the computer readable medium. In this embodiment, the computer program includes instructions to receive an email that is sent from a set top box and instructions to transmit a reply to the email. In this embodiment, the reply is not sent to the set top box.

Referring to FIG. 1, a system is shown and is generally designated 100. As shown, the system 100 includes a set top box 102 that is coupled to a display device, such as a television 104. Additionally, the set top box 102 is coupled to a content provider 106 and a wide area network (WAN) 108, e.g., the Internet. The WAN 108, in turn, is coupled to a customer computer 110 and a destination computer 112.

As shown in FIG. 1, the set top box 102 includes a processor 114 and a memory 116 that is coupled to the processor 114. Further, a receiver 118 is coupled to the processor 114. A remote control unit 120 can communicate with the set top box 102 via the receiver 118. In a particular embodiment, the receiver can be an infrared (IR) receiver or a radio frequency (RF) receiver. A user can input one or more commands to the set top box 102 using the remote control unit 120.

FIG. 1 also shows that the customer computer 110 can include a processor 122 and a memory 124 that is coupled to the customer computer 110. Further, the destination computer 112 can include a processor 126 and a memory 126. Each computer 110, 112 can include an email application for sending and receiving emails via the Internet 108.

Figure 2:
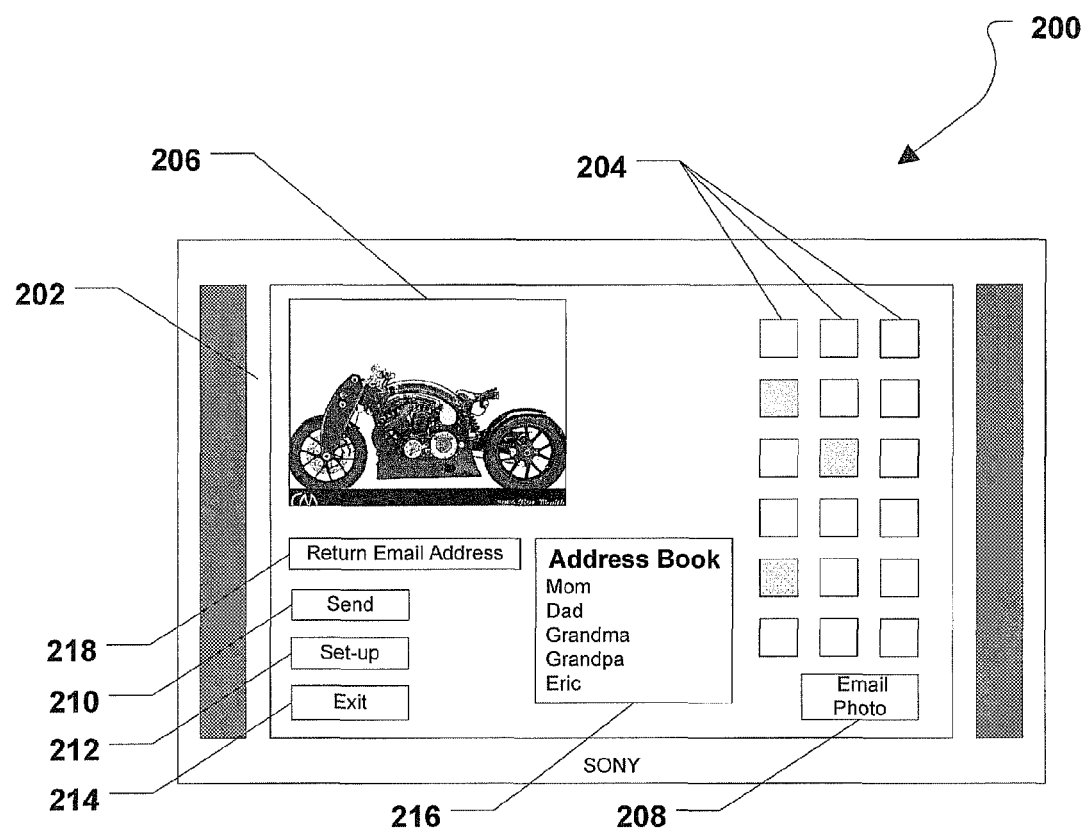
FIG. 2 is a diagram of a graphical user interface for emailing photographs from a set top box.

FIG. 2 illustrates a display on a television 200. In a particular embodiment, the television 200 can be coupled to a set top box, e.g., the set top box 102 depicted in FIG. 1. As shown in FIG. 2, a graphical user interface (GUI) 202 can be presented to a user via the television 200. FIG. 2 shows that the GUI 202 includes a thumbnail image array 204. Further, the GUI 202 can include an image viewing window 206. In a particular embodiment, a user can select an image within the thumbnail image array 204 using a remote control unit and the selected image may be presented in full size within the image viewing window 206.

As further illustrated in FIG. 2, the GUI 202 includes an email photo soft button 208, a send soft button 210, a set-up soft button 212, and an exit soft button 214. Further, the GUI 202 includes an address book 216. When a user toggles the email photo soft button 208, e.g., using a remote control unit, the address book 216 can be presented to the user. In a particular embodiment, the address book 216 includes a list of nicknames and each nickname is linked to a destination email address. A user can select one or more nicknames from the address book 216 and then, toggle the send soft button 210 in order to send one or more selected images from the thumbnail image array 204. In a particular embodiment, the email includes the user's computer email address as a return (e.g., sender) email address 218 in the email. In a particular embodiment, the user's computer email address is not linked to the set top box. As such, a reply to the email sent from the set top box does not get transmitted to the set top box. Rather, a reply to the email gets sent to the user's computer email address (e.g., the return email address 218) and can be viewed at the user's desktop computer, laptop computer, blackberry device, etc. Since reply emails can be sent to the user's computer email account and not to the set top box, a user is not repeatedly interrupted while watching television at the set top box with responses to emails sent from the set top box.

In a particular embodiment, when the address book 216 does not include a nickname or associated email address, e.g., during a first use, the user can be presented with a set-up screen and the user can input one or more emails into the address book via the set-up screen. In a particular embodiment, the set-up screen can also be presented when the set-up soft button 212 is toggled. Further, when the exit soft button 214 is toggled, the GUI 200 can be closed and the user can be returned to normal television viewing.

Figure 3:
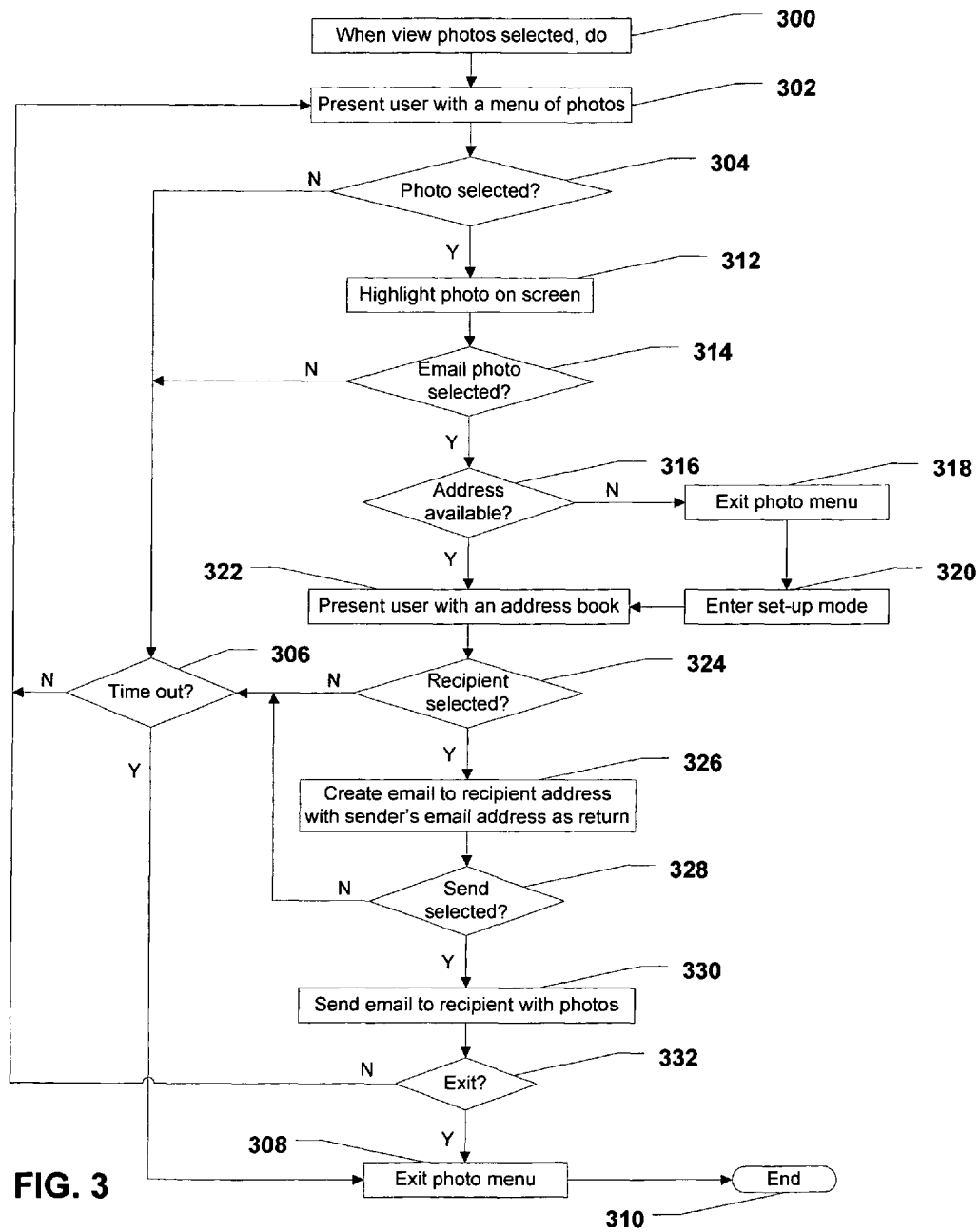
FIG. 3 is a flow chart to illustrate a method of emailing photographs from a set top box.

Referring to FIG. 3, a method of emailing one or more photographs from a set top box is shown. At block 300, when one or more view photos is selected, e.g., using a remote control device, the following steps are performed: At block 302, the set top box presents a user with a graphical user interface for viewing photos. In a particular embodiment, the user can be presented with the GUI 202 shown in FIG. 2.

Continuing to decision step 304, the set top box determines when a photo is selected. If a photo is not selected, the method proceeds to decision step 306 and the set top box determines if a time out period has been exceeded. When the time out period is exceeded, the method moves to block 308 and the set top box exits the photo menu. The method then ends at state 310. Returning to decision step 306, if the time out period is not exceeded, the method returns to block 302 and the user continues to be presented with a menu of photographs.

Returning to decision step 304, if a photograph is selected, the method proceeds to block 312 and the set top box highlights the photo on screen. Proceeding to decision step 314, the set top box determines whether an email photo button is selected. If not, the method proceeds to decision step 306 and continues as described herein. On the other hand, when the email photo button is selected, the method continues to decision step 316 and the set top box determines whether an email address is available. If an email address is not available, the method moves to block 318 and the set top box exits the photo menu. Thereafter, at block 320, the set top box enters a set-up mode and presents a set-up screen. The method then moves to block 322.

Returning to decision step 316, if an email address is available, the method continues to block 322 and the set top box presents the user with an address book. In a particular embodiment, the address book includes one or more nicknames and each nickname is associated with a recipient email address. In another particular embodiment, the address book can include the actual recipient email addresses without any associated nicknames. Further, in yet another particular embodiment, the address book can include a mixture of recipient email addresses and nicknames that are associated with recipient email addresses.

Moving to decision step 324, the set top box determines whether a recipient is selected. If not, the method moves to decision step 306 and continues as described herein. Otherwise, if a recipient is selected, the method proceeds to block 326 and the set top box creates an email to the recipient address. In a particular embodiment, the user can select more than one recipient addresses. Also, in a particular embodiment, the email includes the selected photo as an attachment. Further, in a particular embodiment, the email includes the user's computer email address as the return or sender email address in the email. In a particular embodiment, the user's computer email address is not linked to the set top box. As such, a reply to the email sent from the set top box does not get transmitted to the set top box. Rather, a reply to the email gets sent to the user's computer email address and can be viewed at the user's desktop computer, laptop computer, blackberry device, etc. Since reply emails can be sent to the user's computer email account and not to the set top box, a user is not repeatedly interrupted while watching television at the set top box with responses to emails sent from the set top box.

In a particular embodiment, the user's computer email address is associated with an account that is linked to the set top box. In a particular embodiment, when the user enters into a service agreement with the set top box service provider and obtains an account, the user can provide a computer email address for the account. The computer email address provided for the account can be linked to the set top box. Also, in a particular embodiment, the recipient of the email from the set top box does not have any indication that the email is sent from the set top box. The email from the set top box simply appears to be transmitted from the user's computer. In a particular embodiment, the email can include a text message indicating that the user has sent a photo that he or she would like to share with the recipient.

Proceeding to decision step 328, the set top box determines whether a send button is selected. If not, the method returns to decision step 306 and continues as described herein. On the other hand, after the send button is selected, the method proceeds to block 330 and the set top box sends an email to the recipient with the selected photo or photos as an attachment. In a particular embodiment, when multiple photos are selected, or when otherwise desired, the set top box can compress, or zip, the photos prior to transmission in order to make uploading and downloading the photos quicker.

After, the email is sent, the method proceeds to decision step 332 and the set top box determines whether an exit button has been selected. If not, the method returns to block 302 and continues as described herein. When the exit button is selected, the method proceeds to block 308 and the set top box exits the photo menu. Thereafter, the method ends at state 310.

Figure 4:
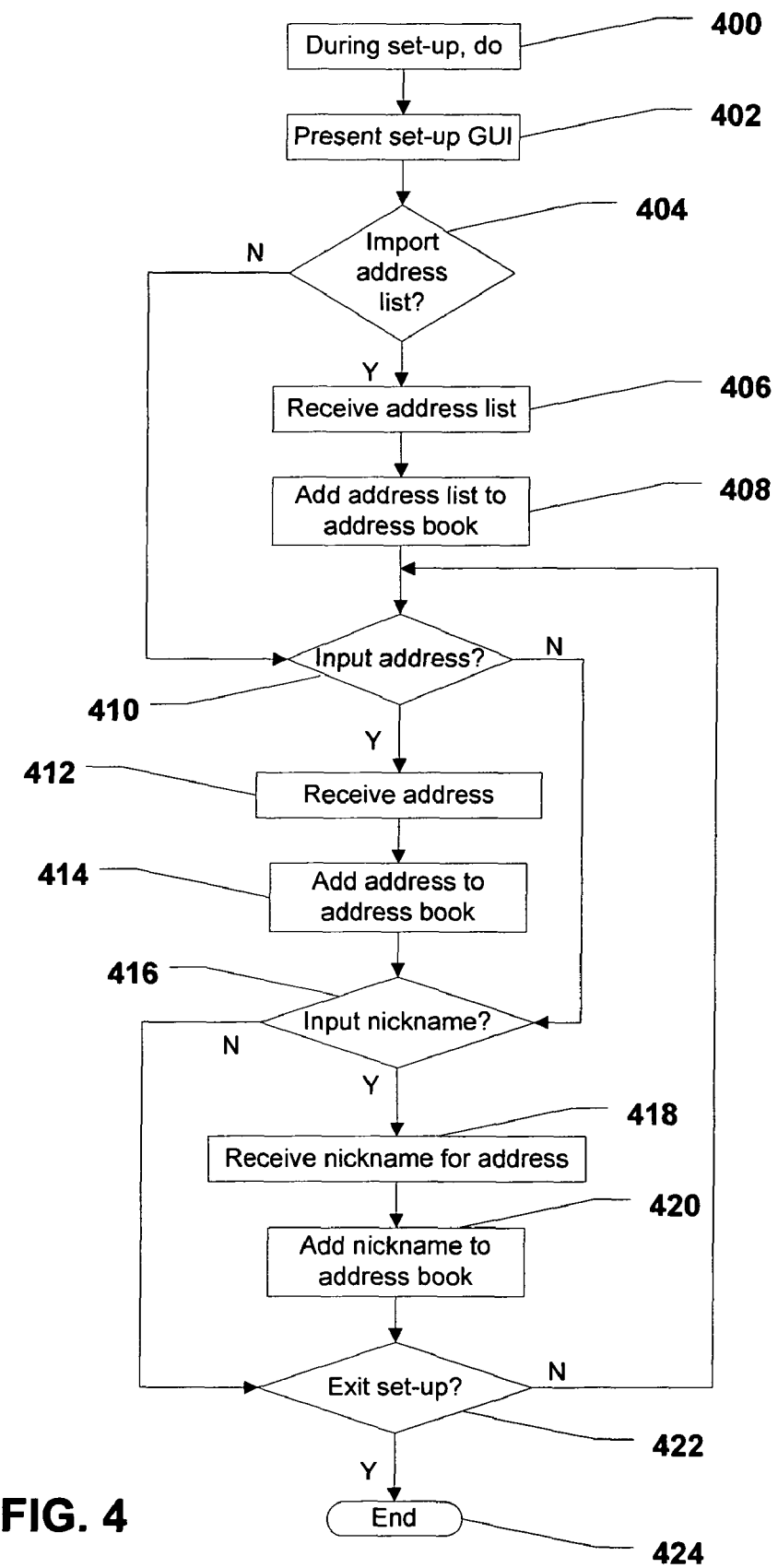
FIG. 4 is a flow chart to illustrate a method of configuring an email address book stored at a set top box.

Referring to FIG. 4, a method of configuring an email address book for a set top box is shown and commences at block 400. At block 400, during set-up, the following steps are performed. At block 402, the set top box presents the user with a set-up graphical user interface (GUI). Thereafter, at decision step 404, the set top box queries the user as to whether the user would like to import an address list. In a particular embodiment, the set top box queries the user by presenting a question at the set-up GUI. If the user wants to import an address list to the set top box, the method proceeds to block 406 and the set top box receives the address list. In a particular embodiment, the user can specify the location of the address list at another device, e.g., a computer, that is networked to the set top box. The set top box can receive the address list from the other device that is networked to the set top box. Additionally, in a particular embodiment, the address list can be imported from an online location via a broadband connection to the set top box. At block 408, the set top box adds the address list to the address book within the set top box. The method then moves to decision step 410.

Returning to decision step 404, if the user does not want to import an address list to the set top box, the method proceeds directly to decision step 410. At decision step 410, the set top box queries the user as to whether the user would like to input an email address. In a particular embodiment, the set top box queries the user by presenting a question at the set-up GUI. If the user wishes to input an email address, the method continues to block 412 and the set top box receives an email address from the user. In a particular embodiment, the email is input to the set top box using a remote control device. Moving to block 414, the email address received from the user is added to the address book. Then, the method moves to decision step 416. Returning to decision step 410, if the user does not wish to input an email address, the method proceeds directly to decision step 416.

At decision step 416, the set top box queries the user as to whether he or she would like to input a nickname for any of the email addresses within the address book within the set top box. In particular, the set top box queries the user by presenting a question via the set-up GUI. If the user wishes to input a nickname, the method proceeds to block 418 and the set top box receives a nickname from the user from an email address within the address book. In a particular embodiment, the nickname can be input to the set top box using a remote control device. Next, at block 420, the set top box adds the nickname to the address book. The method then moves to decision step 422.

Returning to decision step 416, if the user does not want to input a nickname for an email address within the address book, the method proceeds to decision step 422 and the set top box determines whether the user has decided to exit the set-up GUI. If not, the method returns to decision step 410 and continues as described herein. On the other hand, when the user decides to exit the set-up GUI, the method ends at state 424.

With the configuration of structure described above, the system and method of transmitting photographs from a set top box provides a very user friendly way to email photos from a set top box. For example, a user can select a photo from a menu of photos, toggle an email photo soft button, choose a recipient email address, and toggle a send soft button in order to send the photo. Any response to the email is returned to an email address that is associated with the set top box. However, the response is not received at the set top box.

Further, the system and method disclosed herein allows for relatively easy manipulation of the GUI in order to email one or more photos to one or more recipients without the need for an external email client program. Also, the user can define and edit nicknames associated with email addresses stored at the set top box. Additionally, the user can input or delete one or more email addresses stored at the set top box.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure contemplates a machine readable medium containing instructions, or that which receives and executes instructions associated with a propagated signal, so that a device connected to a network environment can send or receive voice, video or data to communicate over the network.

It will be understood that a device as specified by the present disclosure may also be directed to other electronic devices of similar functionality. For example, a device that provides voice, video or data communication may be implemented as a telephone, a cordless telephone, a mobile phone, a cellular phone, a Personal Digital Assistant (PDA) or other computer-based communication devices. As another example, set-top box functionality may be implemented by a computer and/or a server.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of emailing photographs from a set top box, the method comprising:
   presenting a menu at a television coupled to the set top box, wherein the menu concurrently displays thumbnail views of photographs, a viewing window, a send button, and an email photo button;
   displaying an enlarged view in the viewing window of a particular thumbnail view selected via a remote control device;
   receiving, via the remote control device, an indication that the email photo button was selected while the particular thumbnail view is selected;
   adding an address book to the menu in response to the indication, wherein the address book contains one or more recipient email addresses;

receiving selection of a recipient email address from the address book;

transmitting an email to the recipient email address when the send button is selected, wherein the email includes an attachment of a photograph corresponding to the particular thumbnail view and a return email address that will cause a return email to be sent to a location other than the set top box, wherein the return email address corresponds to an email address associated with a user of the set top box;

when no thumbnail view is selected via the remote control device, determining whether a timeout period has been exceeded; and exiting the menu in response to determining that the timeout period has been exceeded.

2. The method of claim 1, wherein a customer account is associated with the user of the set top box.

3. The method of claim 1, wherein the menu includes an exit button to exit the menu.

4. The method of claim 1, further comprising presenting an address book set-up screen prior to adding the address book to the menu in response to the indication.

5. The method of claim 4, further comprising importing an address list to the address book via the address book set-up screen.

6. The method of claim 4, further comprising:
receiving an additional email address via the address book set-up screen; and
adding the additional email address to the address book.

7. The method of claim 6, further comprising:
receiving a nickname for the additional email address; and
adding the nickname to the address book.

8. A set top box, comprising:
a processor;
a non-transitory computer readable medium accessible to the processor;
a computer program stored within the non-transitory computer readable medium, the computer program comprising instructions executable by the processor to:
present a menu at a television coupled to the set top box, wherein the menu concurrently displays thumbnail views of photographs, a viewing window, a send button, and an email photo button;
display an enlarged view in the viewing window of a particular thumbnail view selected via a remote control device;
receive, via the remote control device, an indication that the email photo button was selected while the particular thumbnail view is selected;
add an address book to the menu in response to the indication, wherein the address book contains one or more recipient email addresses;
receive selection of a recipient email address from the address book;
transmit an email to the recipient email address when the send button is selected, wherein the email includes an attachment of a photograph corresponding to the particular thumbnail view and a return email address that will cause a return email to be sent to a location other than the set top box, wherein the return email address corresponds to an email address associated with a user of the set top box;
when no thumbnail view is selected via the remote control device, determine whether a timeout period has been exceeded; and
exit the menu in response to determining that the timeout period has been exceeded.

9. The set top box of claim 8, further comprising instructions to present an address book set-up screen.

10. The set top box of claim 9, further comprising:
instructions to receive one or more recipient email addresses;
instructions to receive a nickname for each of the one or more recipient email addresses; and
instructions to add the one or more recipient email addresses and the corresponding nicknames to the address book.

11. A non-transitory computer readable medium comprising instructions, that when executed by a processor, cause the processor to:
present a menu at a television coupled to a set top box, wherein the menu concurrently displays thumbnail views of photographs, a viewing window, a send button, and an email photo button;
display an enlarged view in the viewing window of a particular thumbnail view selected via a remote control device;
receive, via the remote control device, an indication that the email photo button was selected while the particular thumbnail view is selected;
add an address book to the menu in response to the indication, wherein the address book contains one or more recipient email addresses;
receive selection of a recipient email address from the address book;
transmit an email to the recipient email address when the send button is selected, wherein the email includes an attachment of a photograph corresponding to the particular thumbnail view and a return email address that will cause a return email to be sent to a location other than the set top box, wherein the return email address corresponds to an email address associated with a user of the set top box;
when no thumbnail view is selected via the remote control device, determine whether a timeout period has been exceeded; and
exit the menu in response to determining that the timeout period has been exceeded.

12. The non-transitory computer readable medium of claim 11, further comprising instructions executable by the processor to compress a file corresponding to the photograph to create the attachment.

13. The non-transitory computer readable medium of claim 11, further comprising instructions executable by the processor to exit the menu when the address book does not exist.

14. The non-transitory computer readable medium of claim 13, further comprising instructions executable by the processor to:
enter a set-up mode after exiting the menu when the address book does not exist; and
display an option to import an address list.

15. The non-transitory computer readable medium of claim 13, further comprising instructions executable by the processor to:
enter a set-up mode after exiting the menu when the address book does not exist; and
display an option to allow the user to input one or more email addresses.

16. The non-transitory computer readable medium of claim 11, wherein the menu includes a set-up button to enable modification of the address book.

* * * * *